Patented Mar. 7, 1939

2,149,279

UNITED STATES PATENT OFFICE 2,149,279

DERIVATIVES OF PYRAZINE CARBOXYLIC ACID AND PROCESSES FOR THEIR PRODUCTION

Otto Dalmer, Darmstadt, and Eugen Walter, Munich, Germany, assignors to Merck & Co. Inc., Rahway, N. J., a corporation of New Jersey No Drawing. Application July 5, 1935, Serial No. 29,914. In Germany July 7, 1934

4 Claims. (Cl. 260—250)

This invention relates to derivatives of pyrazine mono-carboxylic acid, and to processes for their production.

Nothing has been known heretofore of the effective physiological properties of pyrazine mono-carboxylic acid and its derivatives. Apparently also the chemical art of this group of compounds has not been well developed.

We have now found that certain derivatives of this acid possess therapeutic properties which are highly desirable. Thus, substituted amides (including herein also the hydrazides) having been hitherto unknown, were discovered to be effective analeptics. They exhibit a marked stimulating effect upon the cardiac, circulatory, and respiratory systems.

According to our invention, these acid amides may, in general, be prepared by the methods suitable for production of amides of carboxylic acid. We have found as particularly adaptable the process of reacting upon pyrazine mono-carboxylic acid chloride (prepared by the action of thionyl chloride on pyrazine mono-carboxylic acid) with amines in anhydrous solvents such as ethyl acetate or benzol at ordinary or at elevated temperatures. We can also react on alkyl esters, of the acid, with amines whereby the addition of solvents will in most cases be unnecessary.

This latter course has been found to be especially serviceable for the preparation of the hydrazides.

By the methods herein disclosed, we have prepared a large number of amides and hydrazides of pyrazine mono-carboxylic acid. In the examples herein are described many substituted amides of the new pyrazine mono-carboxylic acid in which the amide hydrogen is replaced by alkyl, aryl, aralkyl, oxyalkyl or amino-alkyl. Similarly the hydrazides of the new acid may be readily substituted by alkyl and aryl hydrocarbon radicals.

The multiplicity of products thus exemplified herein indicates very well the wide scope of the possibilities of synthesis in this newly developed field.

The amides and the hydrazides embraced herein may be conveniently represented by the following general formulae:

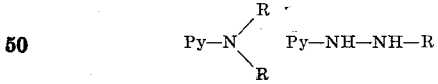

wherein Py represents the pyrazine-mono-carboxylic acid radical, and R is selected from the group consisting of hydrogen alkyl, oxyalkyl, aryl, aralkyl, amino-alkyl and hydroxylated and amidated hydrocarbon radicals.

Examples (1) One part of pyrazine-mono-carboxylic acid methyl ester which has a melting point of 62° is dissolved in 1 part of warm methanol. The solution is cooled, and 2 parts of a solution of NH₃ in methanol, saturated at 0°, are added. After standing for some time, a crystalline precipitate is formed with the evolution of heat. After several hours, the precipitate is separated out by suction and washed with cold methanol; 0.75 to 0.8 part of the amide are obtained having a melting point of 188°.

(2) Twenty parts of crude pyrazine mono-carboxylic acid are boiled with 120 parts of thionyl chloride with refluxing, for about 1 to 2 hours. The thionyl chloride is drawn off in vacuo almost completely and the residue is rapidly distilled in vacuo (boiling point at 5 mm. about 85°). About 18–20 parts of crystalline pyrazine mono-carboxylic acid chloride are obtained. Six parts of this acid chloride are dissolved cold in about 30 parts of ethyl acetate, filtered, allowed to cool slightly, and a solution of 4 parts of mono-ethylamine in 10 parts acetic ester is added drop-wise. After about one hour, the liquid is drawn off by suction, and the filtrate completely concentrated on a water bath. The crystalline residue is then dissolved in ether, decolorized with charcoal, and mixed with petrolether after concentration. The mono-ethylamide of pyrazine mono-carboxylic acid is obtained in lamelliform crystals of pearly luster having a melting point of 68°. The yield obtained was 79% of theory.

(3) Nine and a half parts of pyrazine mono-carboxylic acid chloride are dissolved in 50 parts of benzol and filtered. To the filtrate is added a solution of 12 parts of di-isopropylamine in 10 parts of benzol. After about an hour, the material is filtered by suction and the filtrate completely concentrated in vacuo at about 50–60°. The crystalline residue is dissolved in about 40 parts of water warmed to 60–70°, and to this warm solution a concentrated solution of sodium carbonate is added until the mixture begins to show turbidity. Upon cooling, pyrazine mono-carboxylic acid di-isopropylamide crystallizes out in the form of long needles.

By adding to the mother liquor concentrated sodium carbonate solution, a further quantity of the product can be obtained. For complete purification the dry product is dissolved in about 150 parts of boiling petroleum ether, decolorized with charcoal, and the filtrate concentrated to about 40 parts. After prolonged standing, the pyrazine mono-carboxylic acid di-isopropylamide crystallizes in the form of long needles. The yield is about 7-8 parts (about 70% of theory). The melting point is 74°.

By analogous methods we have also prepared the compounds enumerated in the following tabulation, wherein Py represents pyrazine mono-carboxylic acid:

Py-mono-methylamide; melting point 105°.
Py-di-methylamide; melting point 70°.
Py-diethyl-amide; boiling point, at 6-7 mm., 130-131°.
Py-di-n-propylamide; boiling point, at 8 mm., 158-159°.
Py-mono-($\beta$-oxy-) ethyl-amide; melting point 118°.
Py-di-($\beta$-oxy) ethyl-amide; melting point 79°.
Py-mono-n-butylamide; melting point 41°.
Py-di-n-butylamide; boiling point at 8 mm., 167°.
Py-mono-n-heptylamide; melting point 42-43°.
Py-methyl-benzyl-amide; boiling point at 7 mm., 202°.
Py-dibenzyl-amide; melting point 90°.
Py-phenyl-amide; melting point 123-124°.
Py-(B-amino-) ethylamide; melts with decomposition at 290°.

(4) One hundred and twenty parts of pyrazine mono-carboxylic acid methyl ester are dissolved in 200 parts of absolute alcohol (or methanol). To the boiling solution 50 parts of hydrazine hydrate are added drop-wise. After the reaction is completed, the mass congeals with crystalline structure. After complete cooling, the crystalline mass is separated by suction, and the substance is then purified by recrystallization from alcohol.

The pyrazine mono-carboxylic acid hydrazide crystallizes from alcohol in the form of glossy needles melting at 168°. The yield is about 91.5% of theory.

The following compounds were also prepared analogously by following the general method of Example 4:

Py-monomethyl-hydrazide; melting point 99-100°.
Py-phenyl-hydrazide; melting point 167-168°.

Thus, it will be seen that appropriate adaptation of the method shown in the foregoing examples, having regard for the known constants involved, will serve for the production of a wide range of amides and hydrazides and substituted amides and hydrazides. Therefore, various modifications of the two methods given are obviously possible as to materials and steps employed without departing from the general spirit and scope of the invention as outlined.

We claim as our invention:

1. Pyrazine mono-carboxylic acid derivatives of the general formula Py—NH—NH—R wherein Py represents the pyrazine mono-carboxylic radical and R is selected from the group consisting of hydrogen, methyl, and phenyl radicals.

2. Pyrazine mono-carboxylic acid hydrazide being in the form of glossy needles melting at 168°.

3. Pyrazine monocarboxylic acid monomethyl hydrazide.

4. Pyrazine monocarboxylic acid phenyl hydrazide.

OTTO DALMER.
EUGEN WALTER.